UNITED STATES PATENT OFFICE.

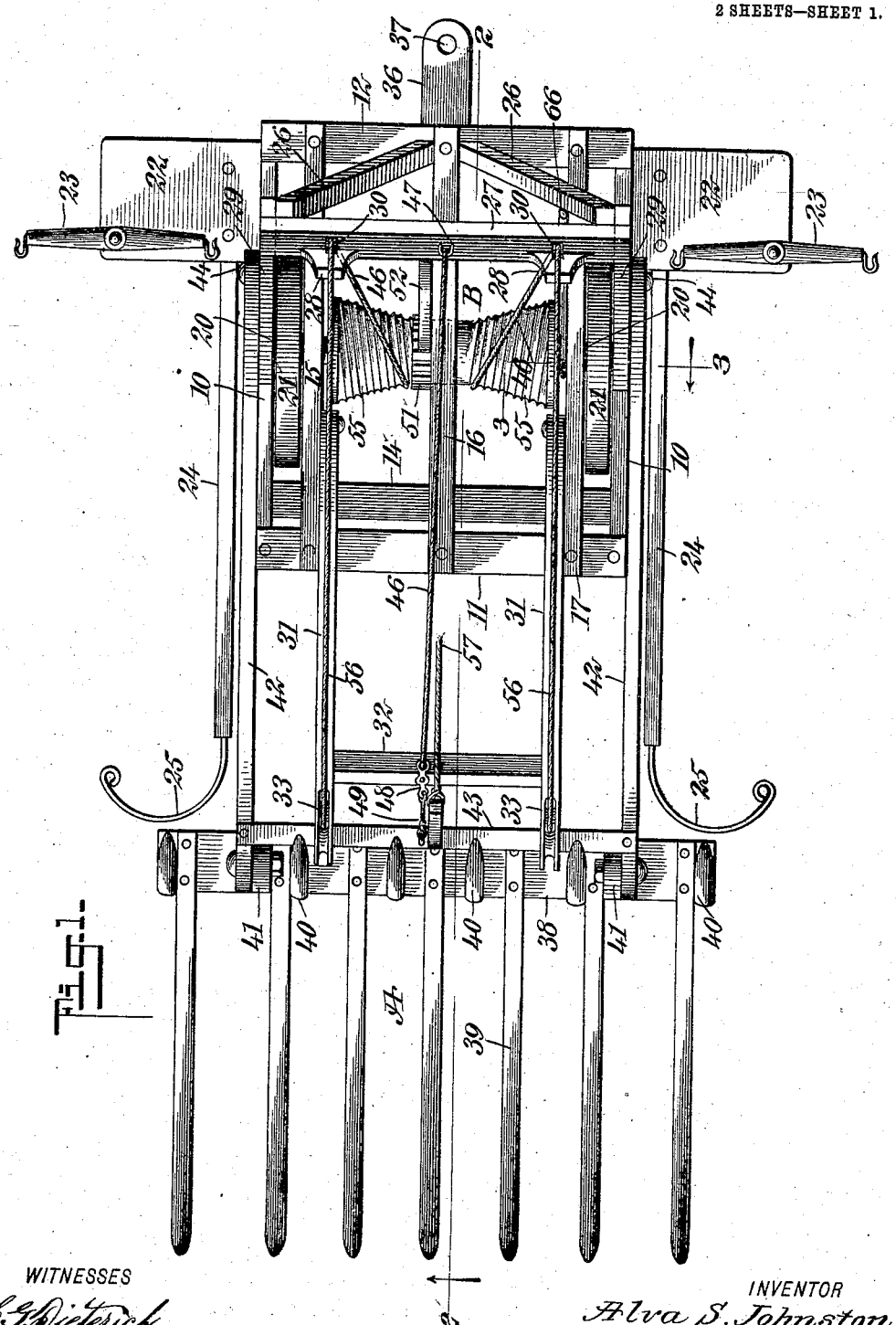

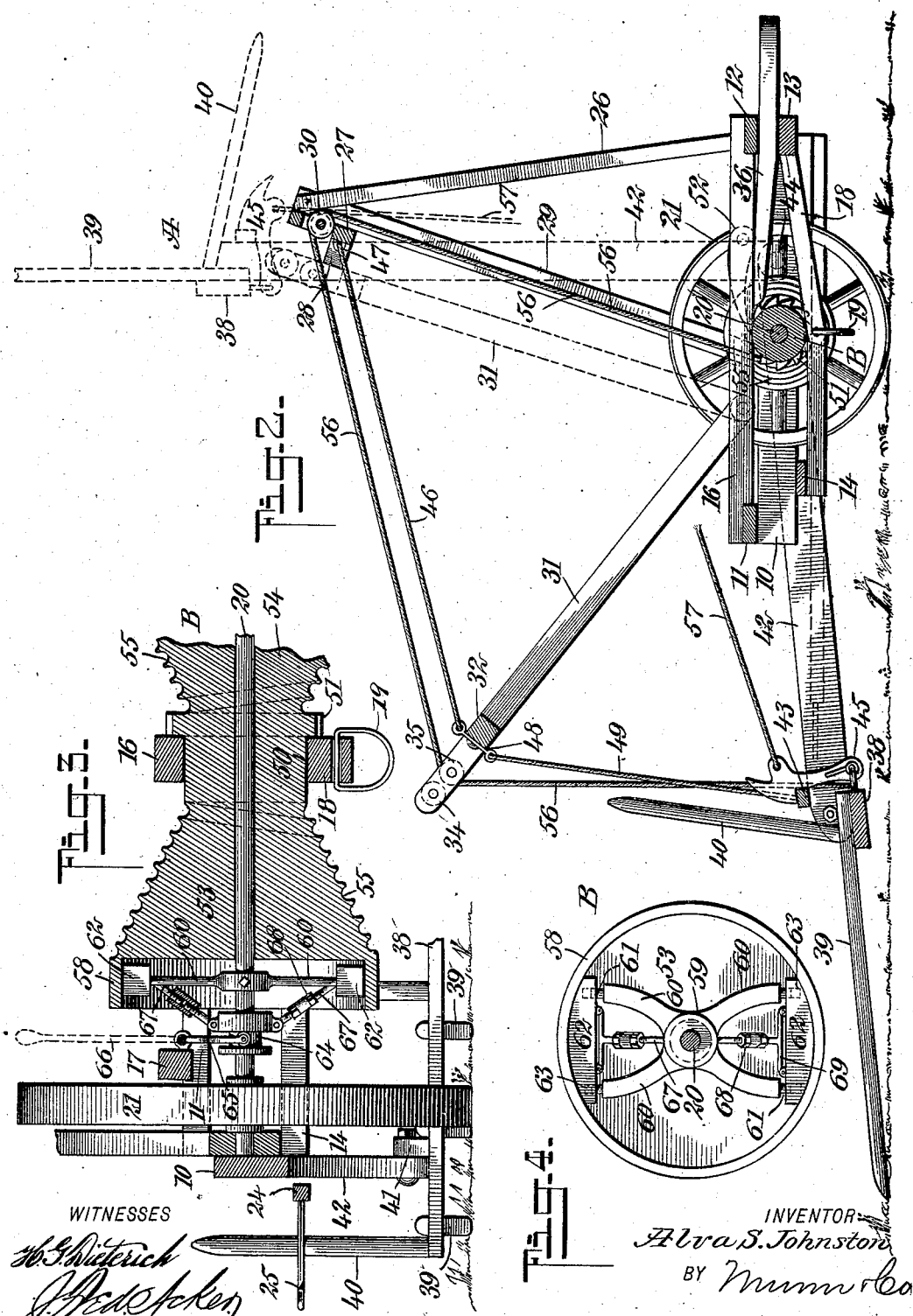

ALVA S. JOHNSTON, OF BELGRADE, MONTANA.

HAY AND GRAIN LOADER.

No. 853,797.  Specification of Letters Patent.  Patented May 14, 1907.

Application filed May 21, 1906. Serial No. 317,965.

*To all whom it may concern:*

Be it known that I, ALVA S. JOHNSTON, a citizen of the United States, and a resident of Belgrade, in the county of Gallatin and State of Montana, have invented a new and Improved Hay and Grain Loader, of which the following is a full, clear, and exact description.

The purpose of the invention is to provide a very simple, durable and economic device for loading shocks of hay and grain from the field into a hay rack drawn by the machine, and to so construct the machine that the fork can be elevated and dumped at any desired time and in an expeditious and convenient manner, to deposit the shocks either in the front or rear portion of the hay rack.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a plan view of the machine; Fig. 2 is a longitudinal vertical section taken practically on the line 2—2 of Fig. 1; Fig. 3 is an enlarged detail section taken substantially on the line 3—3 of Fig. 1; and Fig. 4 is an end view of the drum for elevating the fork and the clutch for operating the said drum.

The frame of the machine, as shown, consists of side sills 10 connected at their upper forward portions by a cross bar 11 and at their upper rear portions by a cross bar 12, together with a lower cross bar 13, a space intervening between the two said cross bars 12 and 13. A second lower cross bar 14 is provided adjacent to the front of said frame.

Longitudinal beams 15, 16 and 17 connect the upper cross bars 11 and 12, and below the central longitudinal beam 16 a lower beam 18 is located, attached to the forward lower cross bar 14 and the rear lower cross bar 13, as shown in Fig. 2. A link 19 is pivotally attached to and extends from the central portion of the said lower longitudinal beam 18 just below the axle 20, which axle is journaled in any approved manner in bearings provided at the side sills 10.

The axle 20 is provided with a supporting wheel 21 adjacent to each of its ends, which wheels are located between the outer longitudinal beams 15 and 17 and the side sills 10, as best shown in Fig. 1; and the said wheels 21 have the usual ratchet connection with the axle, whereby to enable one wheel to travel faster than the other when turning corners, for example.

A platform 22 is horizontally located at each side of the rear portion of the frame, being secured to the side sills 10, as shown in Fig. 1; and at the forward outer end portion of each platform 22 a swingletree 23 is pivoted. A tongue 24 is secured at its inner end to the inner portion of each platform 22, which tongues extend forward a suitable distance beyond the forward end of the frame, as also best shown in Fig. 1. Each tongue 24 is provided with a rigid hook attachment 25 at its forward end, curved outward and rearward, and these hook attachments 25 act in the capacity of neck yokes, enabling the team to conveniently back the machine.

A stationary vertical frame is located at the rear portion of the machine. This frame usually consists of rear standards 26, which are secured to the frame, one at each side of the central longitudinal bar 16, as is shown in Fig. 1, and these standards 26 diverge at their upper ends to a greater or lesser extent and are connected at their upper ends by a head sill 27, which sill is of a length corresponding substantially to the width of the frame as also best shown in Fig. 1. The head sill is provided with forwardly extending offsets 28 near its ends, and the head sill is further stayed by means of braces 29, secured to the end portions of the head sill and to the upper edges of the side sills 10, at a point preferably over the axle 20. The head sill over the projections 28 is provided with openings extending through from front to rear, and in each of said openings a peripherally grooved pulley 30, is mounted to turn. In addition to the fixed rear frame just described a forward pivoted frame is employed, and this forward pivoted frame consists of side pieces or members 31, which are pivoted at their lower ends to the outer longitudinal bars 15 and 17 of the frame, as is shown in Figs. 1 and 2, at a point forward of the axle 20. These side members 31 are connected near their upper ends by a cross bar 32, and at the upper extremity of each of the side members 31 of the said pivoted or swinging frame an elongated opening 33 is produced, as is shown in Fig. 1, and in each of said openings 33 two friction pulleys 34 and 35 are mounted to turn, which pulleys are peripherally grooved, and one of the pulleys is located over the other for a purpose to be hereinafter set forth.

A coupling arm 36 is pivoted to the under face of the upper central longitudinal bar 16 of the frame, and this coupling arm 36 extends out beyond the rear of the frame through the space between the rear cross bars 12 and 13, as particularly shown in Fig. 2; and at the outer end of the coupling arm 36 an opening 37 is made.

This machine is adapted for use in connection with a wheeled hay rack, or a vehicle capable of receiving shocks and such vehicle is drawn by the machine. In coupling the vehicle to the machine, the pole of said vehicle is passed beneath the frame and through the link 19 until the apertured portion 37 of the coupling arm 36 is over that portion of the pole where the pivot bolt of the draft tree passes, and attachment is made between the coupling arm and the pole of the hay rack by passing the said pin also through the opening 37 in the said arm. But the coupling may be otherwise effected with the same elements which have been just described.

The fork A consists of a head bar 38, of sufficient length to extend beyond the sides of the frame, as shown in Fig. 1, and gathering teeth 39, which in the lower position of the fork extend forwardly and downwardly to substantially an engagement with the ground, as is shown in Fig. 2, and back teeth 40, said back teeth having more or less of an upward and rearward inclination.

Lugs 41 are attached to or made integral with the upper face of the head bar 38, and to these lugs 41 the forward or outer ends of supporting arms 42 are pivoted, which supporting arms at their rear ends are pivotally attached to the side sills 10 of the frame at a point to the rear of the axle 20, as shown at 44 in Fig. 1; and the said supporting arms 42 are connected at their forward portions by a cross bar 43, which cross bar is almost over the rear edge portion of the head bar 38 and is parallel therewith.

The fork is held locked to the swinging frame of which the supporting arms 42 constitute the main part, by means of a spring latch 45, shown best in Fig. 2, the head of which latch is normally in engagement with the upper face of the cross bar 43 connecting the arms 42; and when the latch is in such position the gathering fingers 39 of the fork are substantially in longitudinal alinement with the supporting arms 42 for the fork, and the fork remains thus locked to its supporting and carrying frame until said fork has been carried up to a rear position shown in dotted lines in Fig. 2, which is its dumping position, and at such time the latch 45 which is carried by the head bar 38 is released from its engagement with the cross bar 43 of the said carrying frame.

The forward inclination of the swinging frame of which the arms 31 form a part, is limited by means of a cable 46, which is attached to the head sill 27 of the fixed rear frame, as is shown at 47 in Figs. 1 and 2; and the forward end of the cable 46 is attached to a suitable fitting 48, secured upon the cross bar 32 of the said swinging frame; and a second cable 49 is also attached to the fitting 48, which latter cable extends down and is attached to the cross bar 43 of the fork supporting and carrying frame. The cable 49 limits the downward movement of the fork, and prevents its head bar 38 engaging with the ground while its teeth 39 are gathering up a shock.

The fork A is raised and lowered through the medium of a drum B, which drum is loosely mounted on the axle 20, as shown in Fig. 3. This drum is provided with a central cylindrical section 50, which section is provided with exteriorly located ratchet teeth 51, engaged by a pawl 52, suitably mounted on the frame, as is best shown in Fig. 1. The end portions of the drum B are conical, being of greatest diameter at the terminals of the drum, and said conical sections are designated as 53 and 54, and each of said conical sections is provided with an exterior spiral groove 55, extending from the central or cylindrical section 50 of the drum practically to the outer edges of said conical sections, as is shown in Figs. 1 and 3.

A cable 56 is secured to each conical section of the drum B at its reduced portion, as is shown in Fig. 1, the cables being adapted to wind upon the said conical sections in their grooves 55 as the drum B is revolved. These cables 56 are carried upward from the drum over the pulleys 30 in the head sill of the rear stationary frame, and from thence forward through the spaces between the friction rollers 34 and 35 carried by the swinging frame, and are then carried down in engagement with the lower pulleys 35 to an attachment to the head bar 38 of the rake, one cable being secured at each side of the center of said bar.

It will be observed that as the drum is rotated the fork is raised, first slowly, and then as the fork is elevated and the cables are wound upon the outer portions of the drums, the fork is carried up to a dumping position with a very quick movement.

A cable 57 is attached to the latch 45 leading down to within convenient reach from the frame of the machine, and by means of said cable 57 the latch is released from locking engagement with the cross bar of the fork carrying frame, for the purpose of permitting the said fork to turn upon its pivots and assume a decidedly downwardly inclined position to dump the load carried thereby.

One end of the drum B, preferably the right-hand end, is provided with a circular marginal flange 58, as best shown in Fig. 3; and the drum is revolved when desired through the medium of a clutch which acts upon the aforesaid flange. The preferred construction of this clutch is shown in detail in Figs. 3 and 4. It consists of a frame 59 of spider-like construction, which frame is secured firmly to the axle 20 within the chamber formed by the drum flange 58, and in the construction of this frame upper and lower pairs of arms 60 are provided, and each arm terminates at its outer end in a pin extension 61. These pin extensions enter and have free movement in apertures 63 produced in head blocks 62, the outer edges of which head blocks are convexed so that they can be brought into close frictional engagement with the inner face of the drum flange 58.

A sleeve 64 is mounted to slide on the axle 20 and turn with said axle outside of the chambered portion of the drum, and the sleeve is moved in or out by means of a conventional shifting fork 65 operated by a lever 66 suitably located at the rear portion of the frame of the machine. Operating arms 67 are pivotally connected at diametrically opposite points to the sleeve 64, as is best shown in Fig. 3; and these operating arms 67 are preferably made in two sections adjustably connected by threaded sleeves 68; and the outer members 69 of the said operating arms 67 are practically T-shaped. The outer or horizontal portions of the outer sections of the said operating arms are pivotally connected to the head blocks 62 between the recesses 63 therein. Thus in operation, if the sleeve 64 is carried in or toward the drum B, the head blocks 62 are slid outward in opposite directions on their supports and are brought to and held in close frictional engagement with the inner face of the flange 58 of the drum B, and said drum is continually revolved while said contact exists; but as soon as the sleeve 64 is carried away from the drum the head blocks are free to move inward or toward the axle and out of frictional engagement with the said flange 58, consequently stopping the rotation of the drum.

In the operation of the entire device, when the fork is in its lower position shown in Fig. 2, the gathering fingers at their outer ends run close to the ground and pick up the shocks in their path. When the fork has been sufficiently loaded, the said clutch is brought into frictional engagement with the drum B and the drum in revolving winds the cables 56 thereon and elevates the said fork and its carrying frame in the manner heretofore described. As the fork-carrying frame is carried upward and rearward the swinging frame is likewise carried inward and rearward, as shown by dotted lines in Fig. 2, until it engages with the projections 28 from the head sills 27 of the rear fixed frame. As the supporting arms 42 for the fork reach the perpendicular position shown by dotted lines in Fig. 2, the said arms will have passed the said swinging frame to a greater or lesser extent, and the cables 56 will then be in engagement with the upper pulleys 34 on said swinging frame. If the latch 45 is disconnected at such time from the cross bar 43 the fork will drop downward and rearward sufficiently to deposit the load carried thereby in the forward portion of the hay rack. The prime object of the ratchet 51 and pawl 52, is to hold the fork out of contact with the ground when turning corners and when traveling to and from the field, since, by raising the fork to a convenient height and then relieving the tension, the pawl will drop and bear on the ratchet so as to prevent the fork from dropping until the pawl is raised. Should it be desired to dump the load in the rear portion of the hay rack, after the combined supporting and carrying frame for the fork has reached an upright position, the cables 56 are slackened, permitting the fork and its frame to drop further rearward, or sufficiently to bring the delivery end of the fork over the rear of the rack. After the load of the fork has been dumped, the clutch is disengaged from the drum and the fork-supporting and carrying frame is pressed forward until it overcomes its dead center, whereupon it will drop automatically to its receiving position, the cables 56 meanwhile unwinding.

The frame which I have heretofore designated a swinging frame and composed of the members 31 and 32, may be properly termed a guide frame, and will be hereinafter so referred to in the claims.

Having thus described my invention, I claim as new, and desire to secure by Letters Patent,—

1. In a hay and grain loader, a wheel-supported main frame, a head sill rigidly supported above the same at the rear, a swinging guide frame, and a carrying frame independently pivoted to the main frame, a fork pivotally connected with the carrying frame, a winding drum, a clutch mechanism carried by the axle of the main frame and adapted for engagement with said drum, and cables attached to the drum and to the said fork, said cables being passed through the head sill and the swinging guide frame.

2. In a hay and grain loader, a wheel-supported main frame, a head sill rigidly supported above the same at the rear, a swinging guide frame and a carrying frame independently pivoted to the main frame, a fork pivotally connected with the carrying frame a winding drum, a clutch mechanism carried by the axle of the main frame and adapted for engagement with said drum, and cables attached to the drum and to the said fork, said cables being passed through the head sill and the swinging guide frame, a latch on the fork for engagement with the carrying frame, a ratchet and pawl locking device for the drum, a pole-receiving link beneath the main frame, and a pivoted coupling arm which extends out beyond the rear of the main frame.

3. In a hay and grain loader, a wheel supported main frame, a head sill rigidly supported above the same at the rear, a swinging guide frame and a carrying frame independently pivoted to the main frame, a fork pivotally connected with the carrying frame, a winding drum a clutch mechanism carried by the axle of the main frame and adapted for engagement with said drum, and cables attached to the drum and to the said fork, said cables being passed through the head sill and the swinging guide frame, a latch on the fork for engagement with the carrying frame, and a ratchet and pawl locking device for the drum.

4. In a hay and grain loader, a wheel supported main frame, a head sill rigidly supported above the same at the rear, a swinging guide frame, and a carrying frame independently pivoted to the main frame, a fork pivotally connected with the carrying frame, a winding drum having conical spiral grooved end sections, a clutch mechanism carried by the axle of the main frame and adapted for engagement with said drum, and cables attached to the end sections of the drum and to the said fork, said cables being passed through the head sill and the swinging guide frame.

In testimony whereof I have signed my name to this specification in the presence of two subscribing witnesses:

ALVA S. JOHNSTON.

Witnesses:
CHAS. VANDENHOOK,
W. H. CLARK.